(12) United States Patent
El Eglick

(10) Patent No.: US 10,285,493 B2
(45) Date of Patent: May 14, 2019

(54) CONTAINER AND ONE-WAY VALVE

(71) Applicant: Dan El Eglick, Eilat (IL)

(72) Inventor: Dan El Eglick, Eilat (IL)

( * ) Notice: Subject to any disclaimer, the term of this patent is extended or adjusted under 35 U.S.C. 154(b) by 74 days.

(21) Appl. No.: 15/588,648

(22) Filed: May 7, 2017

(65) Prior Publication Data
US 2017/0325577 A1    Nov. 16, 2017

(30) Foreign Application Priority Data
May 10, 2016   (IL) .......................................... 245590

(51) Int. Cl.
| | |
|---|---|
| *B43M 11/06* | (2006.01) |
| *A46B 11/00* | (2006.01) |
| *B65D 35/36* | (2006.01) |
| *B65D 35/22* | (2006.01) |
| *B65D 75/42* | (2006.01) |
| *B65D 35/02* | (2006.01) |
| *A47G 19/32* | (2006.01) |
| *A46B 9/02* | (2006.01) |

(Continued)

(52) U.S. Cl.
CPC .......... *A46B 11/0041* (2013.01); *A45D 24/26* (2013.01); *A45D 34/00* (2013.01); *A45D 34/041* (2013.01); *A45D 40/00* (2013.01); *A45F 3/20* (2013.01); *A46B 9/023* (2013.01); *A46B 9/04* (2013.01); *A46B 11/0062* (2013.01); *A47G 19/183* (2013.01); *A47G 19/32* (2013.01); *B65D 1/04* (2013.01); *B65D 21/08* (2013.01); *B65D 35/02* (2013.01); *B65D 35/22* (2013.01); *B65D 35/36* (2013.01); *B65D 75/42* (2013.01); *B65D 83/0005* (2013.01); *B65D 83/0055* (2013.01); *F16K 15/14* (2013.01); *F16K 15/147* (2013.01); *A46B 2200/102* (2013.01); *A46B 2200/104* (2013.01); *A46B 2200/1066* (2013.01)

(58) Field of Classification Search
CPC ............ A46B 11/0041; A46B 11/0062; A46B 2200/102; A46B 2200/1066; A46B 2200/104; B65D 75/42; B65D 83/0055; F16K 15/147; F16K 15/14
See application file for complete search history.

(56) References Cited

U.S. PATENT DOCUMENTS

| | | | | |
|---|---|---|---|---|
| 4,850,729 A | * | 7/1989 | Kramer | ............. A46B 11/0041 401/183 |
| 4,850,730 A | * | 7/1989 | Jimenez | ............. A46B 11/0041 401/184 |

(Continued)

FOREIGN PATENT DOCUMENTS

GB    2426751    12/2006

*Primary Examiner* — Jennifer C Chiang
(74) *Attorney, Agent, or Firm* — Alphapatent Associates, Ltd; Daniel J. Swirsky

(57) ABSTRACT

A one-way valve adapted to be provided in a pressable container from which material is ejected wherein the valve includes: two adjacent tongues extending from a circumference of the pressable container, wherein the two adjacent tongues have two states: a first state wherein the tongues are not folded on a fold line, thereby the material passes between the tongues; and a second state wherein the tongues are folded on the fold line and prevent passage of material through them; and an opening, for ejecting the material therethrough at the first state, wherein the opening is disposed above the fold line at the first state, and below the fold line at the second state.

6 Claims, 18 Drawing Sheets

(51) Int. Cl.
    *A46B 9/04*       (2006.01)
    *A45D 34/04*     (2006.01)
    *B65D 83/00*     (2006.01)
    *F16K 15/14*     (2006.01)
    *A47G 19/18*     (2006.01)
    *B65D 21/08*     (2006.01)
    *B65D 1/04*      (2006.01)
    *A45D 24/26*     (2006.01)
    *A45D 34/00*     (2006.01)
    *A45D 40/00*     (2006.01)
    *A45F 3/20*       (2006.01)

(56) References Cited

U.S. PATENT DOCUMENTS

| | | | |
|---|---|---|---|
| 5,169,030 A | 12/1992 | Lewin | |
| 6,241,412 B1* | 6/2001 | Spies | A46B 11/002 |
| | | | 206/532 |
| 7,077,296 B2* | 7/2006 | Brown | B65D 47/2031 |
| | | | 220/203.08 |
| 8,087,843 B2* | 1/2012 | Ottaviani | A46B 11/0041 |
| | | | 15/22.1 |
| 2004/0265523 A1* | 12/2004 | Koyanagi | B65D 81/052 |
| | | | 428/35.7 |
| 2006/0021629 A1 | 2/2006 | Mu et al. | |
| 2017/0030472 A1* | 2/2017 | Hall | F16K 21/04 |

* cited by examiner

CONTAINER AND ONE-WAY VALVE

CROSS-REFERENCE TO RELATED APPLICATIONS

This application claims the benefit of priority from Israel Patent Application No. 245590, filed May 10, 2016, the disclosure of which is incorporated herein by reference.

FIELD

The present invention relates to valves in pressable containers. More particularly, the present invention relates to one-way conduction of materials such as creams, paste, liquids, viscose liquids, sauces, etc. out of pressable containers in order to prevent remnants from being left in the container and full utilization of the material.

BACKGROUND

Creams like toothpaste, hand cream or ketchup are usually stored in pressable containers like tubes. In order to eject the cream out of the container, one should press the container and milk it out. Moreover, normally it's recommended to hold the container in a specific state to ease the ejection.

The problem in those methods is in achieving a full utilization of the product. There is no way to ensure that by pressing the containers all of the cream stored in it will be ejected and used. Normally there are remnants left inside, although the user squeezes the paste out by pressing all over the container and holds it in different holding positions.

U.S. Pat. No. 5,169,030, US20060021629 and GB2426751 disclose valves for a container. However, none of them discloses more than one state for the valve.

SUMMARY

In various aspects of the invention apparatus and methods are provided for achieving maximal utilization of all the material stored in a pressable container by squeezing the material out.

In various aspects of the invention a method is provided of full utilization of a cream stored in a pressable container without any use of an external device to help squeezing the cream out. The method is based on a one-way conduction of the cream in the pressable container.

BRIEF DESCRIPTION OF THE DRAWINGS

In order to better understand the invention and appreciate its practical application, the following drawing figures are attached and referenced herein. Like components are denoted by like reference numerals.

It should be noted that the drawing figures are given as examples and preferred embodiments only and in no way limit the scope of the present invention as defined in the appending Description and Claims.

DETAILED DESCRIPTION

Figure 1:
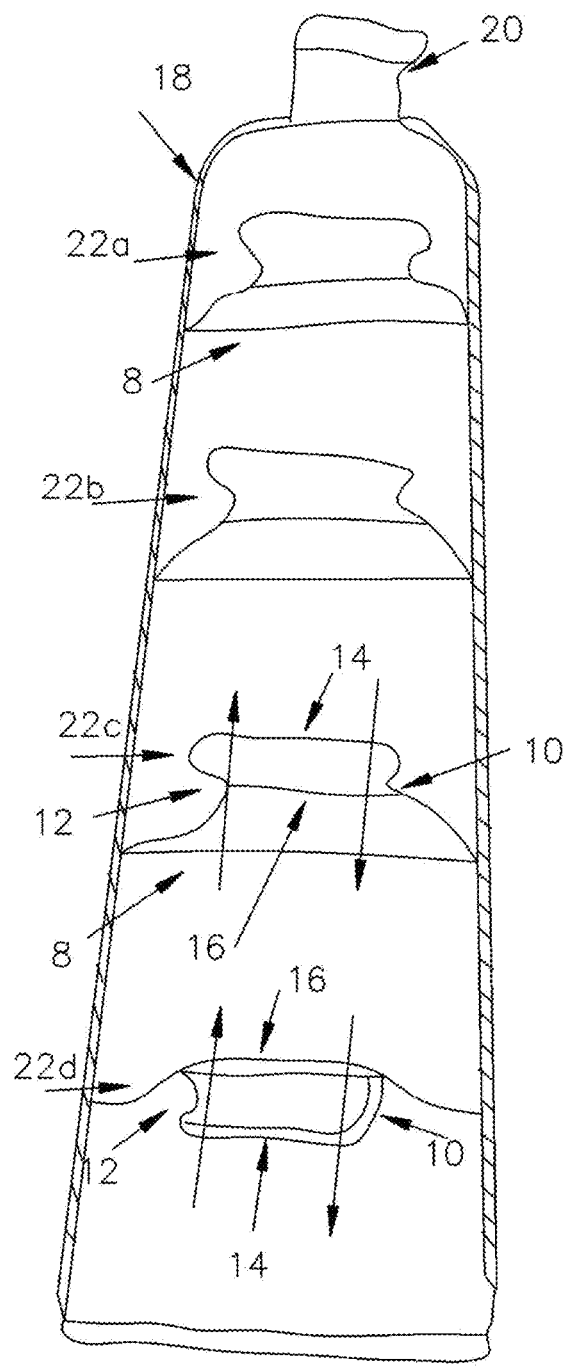
FIG. 1 illustrates a cross-sectional view of an apparatus for one-way conduction of a cream out of a tube in accordance with a preferred embodiment of the present invention.

Reference is now made to FIG. 1 illustrating a cross-sectional view of an apparatus for one-way conduction of cream out of the tube in its preferred embodiment of the present invention. Tube 18 is an embodiment of a pressable container. Tube 18 contains a cream that should be ejected out through the tube's opening 20 by pressing the tube. Inside tube 18, as shown in FIG. 1, there are four one-way conduction valves 22a, 22b, 22c, 22d. Valves 22a, 22b, 22c are in a conducting state, while valve 22d is already in a non-conducting state of the valve.

Figure 2:
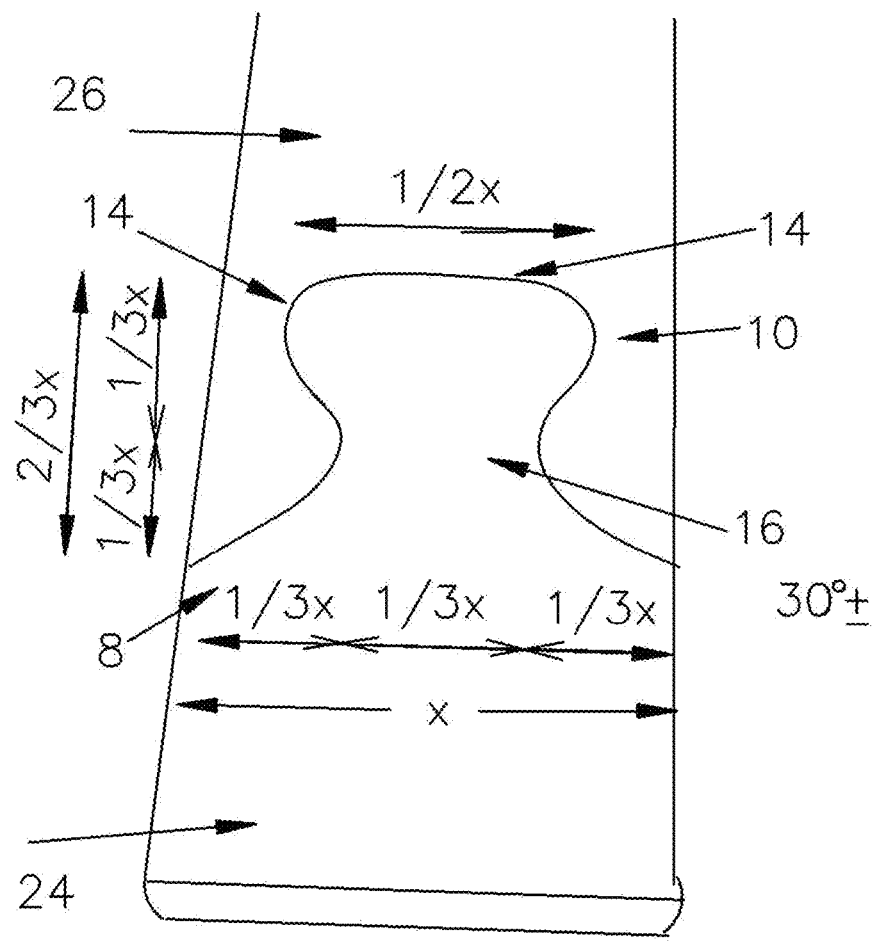
FIG. 2 illustrates a cross-sectional view of the one-way conduction valve in accordance with a preferred embodiment of the present invention, in a conducting state.

Reference is now made to FIG. 2, illustrating a cross-sectional view of the one-way conduction valve in a conducting state. FIG. 2 better illustrates one of valves 22a, 22b, 22c, 22d. The valve comprises two connected sealed tongues. The connection of the tongues is at sides 10 and 12, both are sealed. The cream is to be ejected through opening 14. The valve is positioned while a portion of the material is stored beneath the valve; hence area 24 and the portion of the material is stored above the valve in the direction of the ejection of the material through the tube's opening; hence area 26. By pressing the tube on area 24, the cream is ejected through valve opening 14. After conducting the material from area 24 to area 26, the valve switches to its non-conducting state as shown in FIG. 3 and prevents the cream from being conducted from area 26 back to area 24.

Figure 3:
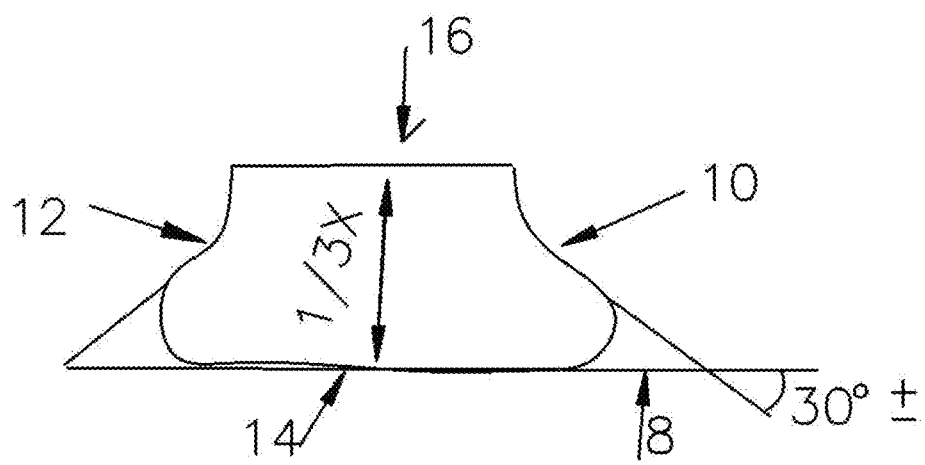
FIG. 3 illustrates a cross-sectional view of the one-way conduction valve in accordance with a preferred embodiment of the present invention, in a non-conduction state.
Figure 4A:
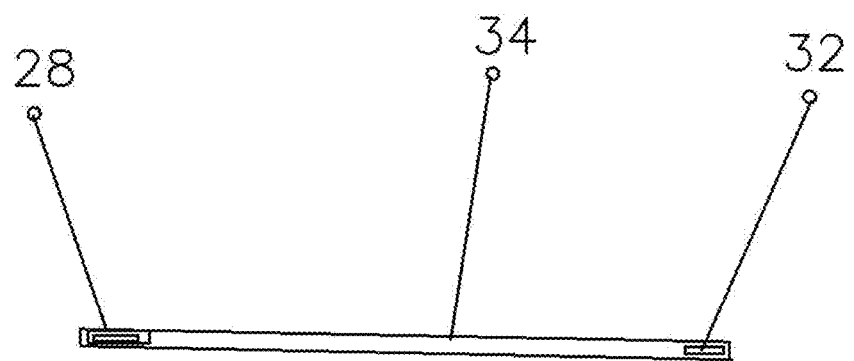
FIGS. 4a, 4b, 4c, and 4d illustrate an upper view, front view, side view and back view, respectively, of the one-way conduction valve as shown in FIG. 3.
Figure 4:
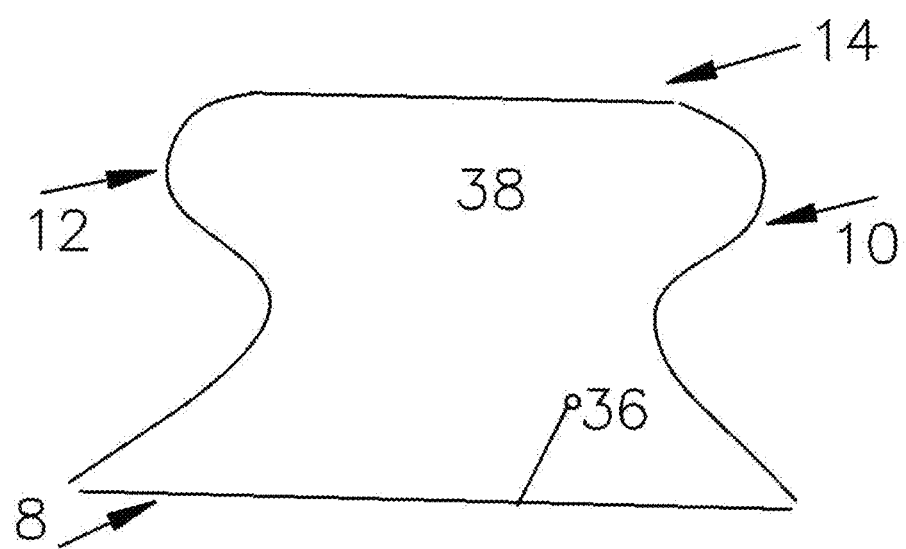
Figure 4C:
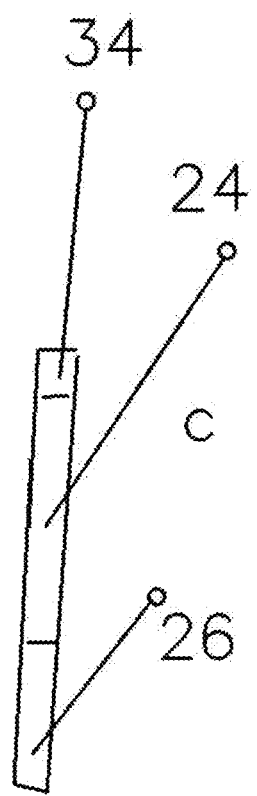
Figure 4D:
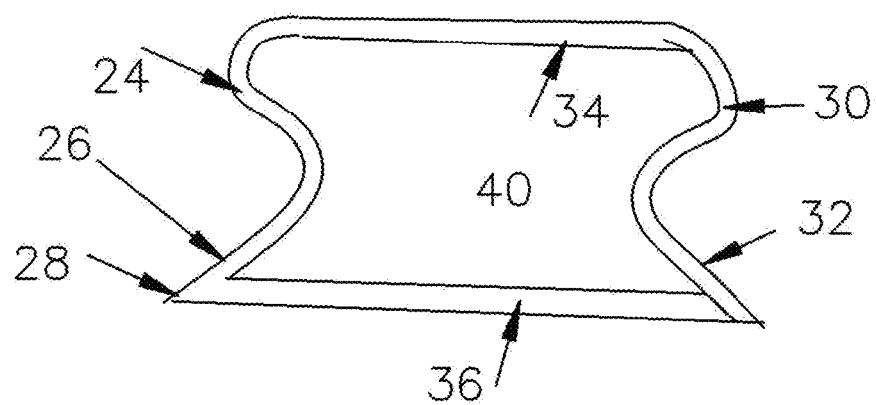

Reference is now made to FIG. 3, illustrating a cross-sectional view of a one-way conducting valve in a non-conducting state. At the non-conducting state, the valve is folded at a fold line 16 (fold line 16 can be seen also in a non-folded state in FIG. 2). At this folding state, a fold line 16 is sealing the conduction of the cream through valve opening 14, backwardly to area 24, such that the distance between fold line 16 and opening 14 diminishes, e.g. to half as depicted in FIG. 3 in relation to FIG. 2, thereby prevents splashing of the cream.

Reference is now made to FIGS. 4a, 4b, 4c, and 4d, illustrating an upper view, front view, side view and back view, respectively, of the one-way conducting valve as shown in FIG. 3. The two connected tongues are 38 and 40, while the diameter of tongue 38 is bigger than the diameter of tongue 40. The tongues tangential areas are 24, 26, 28, 30 and 32. The conduction of the cream is through areas 34 and 36, which are the non-connected areas between the tongues.

Figure 5:
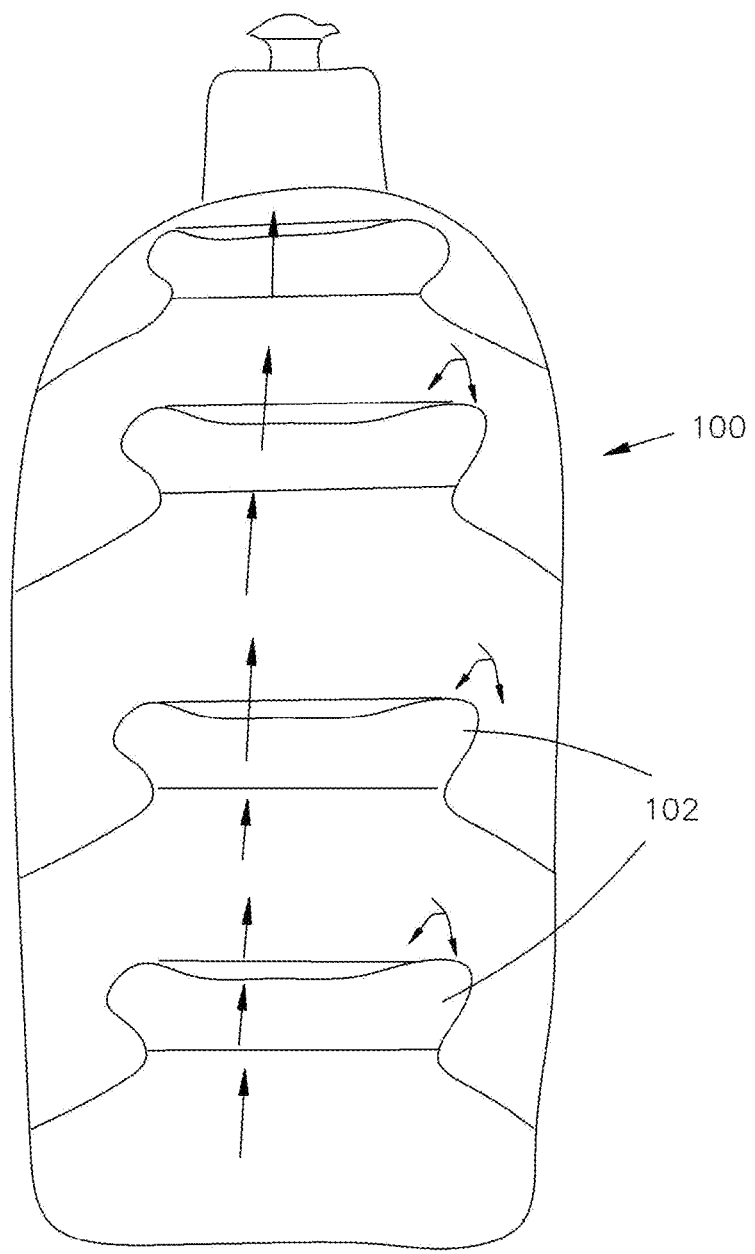
FIG. 5 illustrates a cross-sectional view of an apparatus for an active ejection of a viscous liquid (as shampoo) out of pressable bottle in accordance with a preferred embodiment of the present invention.

Reference is now made to FIG. 5, illustrating a cross-sectional view of the apparatus for a one-way conduction of a viscous liquid (as shampoo) out of a pressable bottle in accordance of a preferred embodiment of the present invention. The pressable bottle 100 is the preferred embodiment when using a pressable bottle stored with a viscous liquid. One-way valves 102 are provides within pressable bottle 100. After a portion of the shampoo is removed out of the bottle, the bottom portion is empty and the material from the upper portion cannot go back to the bottom portion due to the bottom one-way valve.

Figure 6:
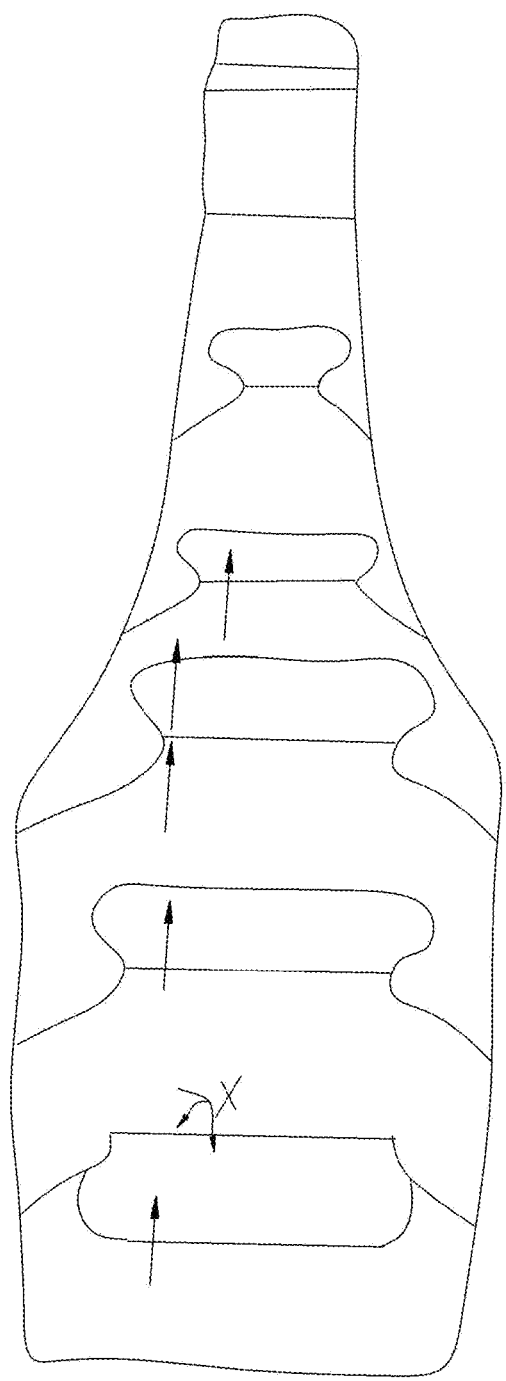
FIG. 6 illustrates a cross-sectional view of an apparatus for one-way conduction of fizzy drink out of a pressable bottle in accordance with a preferred embodiment of the present invention.

Reference is now made to FIG. 6, illustrating a cross-sectional view of the apparatus for a one-way conduction of fizzy drink out of a pressable bottle. The uniqueness of this embodiment is expressed in the realization of using the present invention to solve the problem of gas escaping out of the fizzy drink. After a portion of the drink is consumed, the portion that is left in the bottle is not exposed to the air so as to prevent the gas from escaping.

Figure 7:
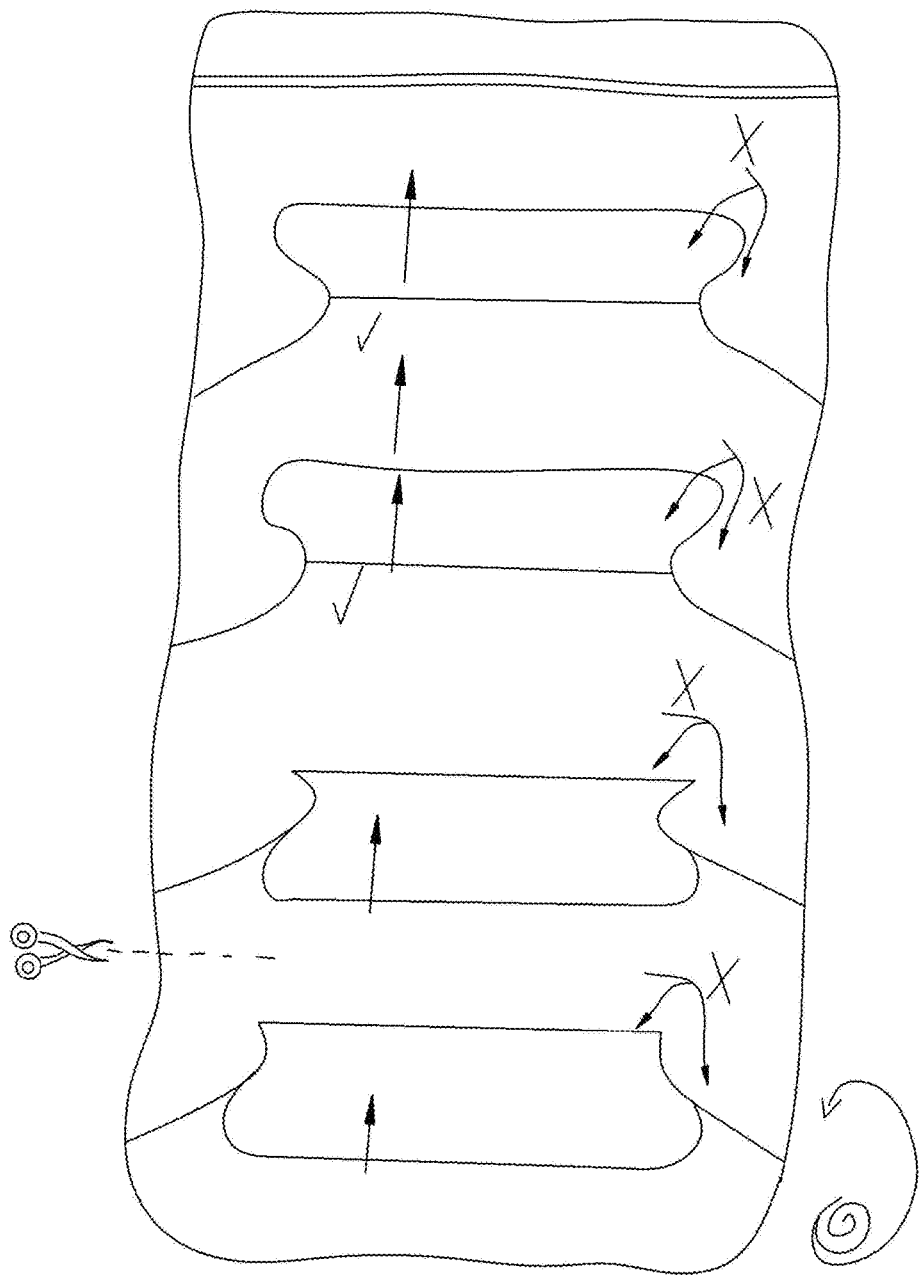
FIG. 7 illustrates a cross-sectional view of an apparatus for one-way conduction of milk, powders, or any other bulk products, out of a plastic bag in accordance with a preferred embodiment of the present invention.

Reference is now made to FIG. 7, illustrating a cross-sectional view of an apparatus for a one-way conduction of milk, powders or any other bulk products, out of a plastic bag, in accordance with a preferred embodiment of the present invention. After the contents of the plastic bag have passed a valve, the valve switches to its non-conducting state. When the valve switches to its non-conducting state one can roll the bag or cut it in the space between the two non-conducting valves.

Figure 8:
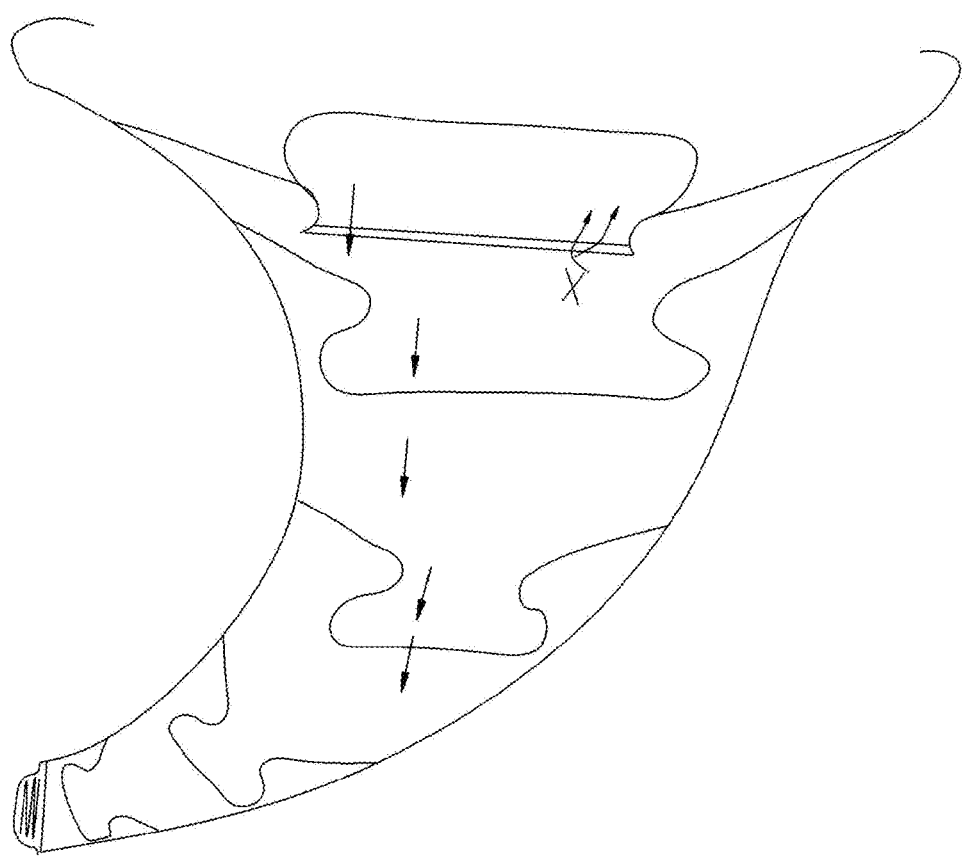
FIG. 8 illustrates a cross-sectional view of an apparatus for a one-way conduction of whipped cream out of a splashing bag in accordance with a preferred embodiment of the present invention.

Reference is now made to FIG. 8, illustrating a cross-sectional view of an apparatus for a one-way conduction of whipped cream out of a splashing bag. The cream is inserted into the bag through the opening at the top of the bag.

Figure 9:
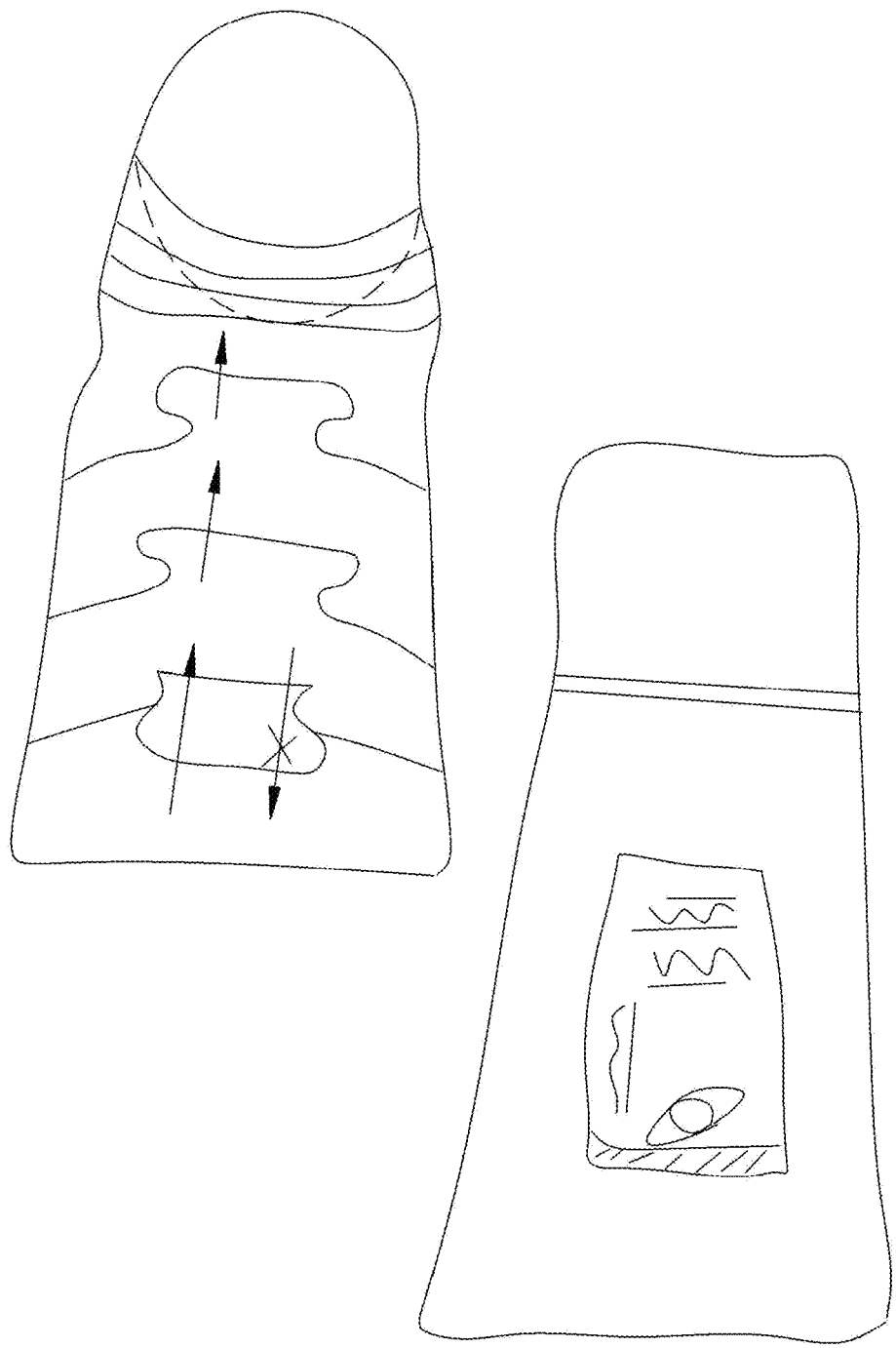
FIG. 9 illustrates a cross-sectional view of an apparatus for a one-way conduction of liquids out of a roll-on bottle as deodorant in accordance with a preferred embodiment of the present invention.

Reference is now made to FIG. 9, illustrating a cross-sectional view of an apparatus for a one-way conduction of liquids out of a roll-on bottle as deodorant. The liquid is captured at the head of the container around the ball, and every drop that passed the upper valve cannot go back to the bottom of the container.

Figure 10:
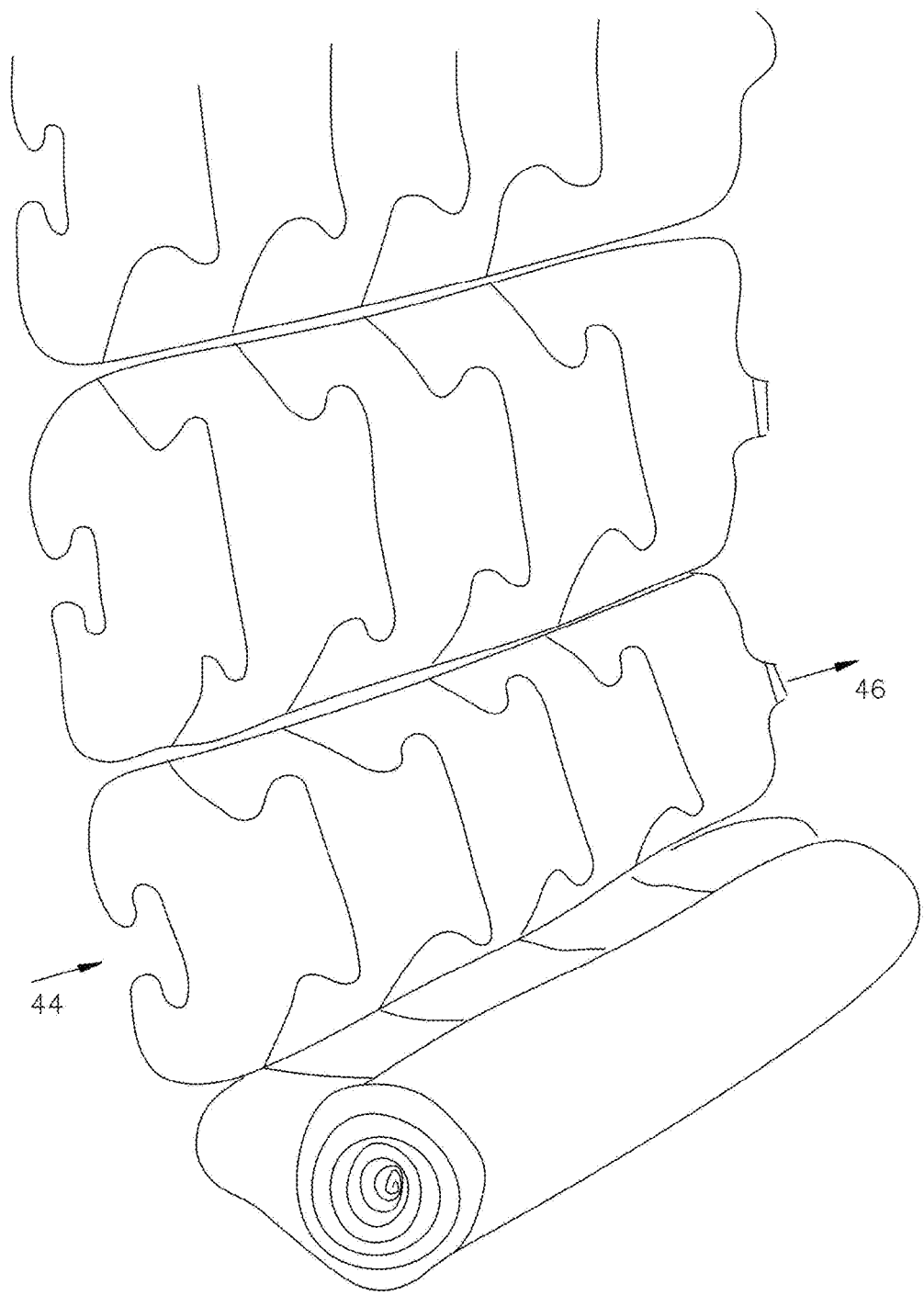
FIG. 10 illustrates a cross-sectional view of a cylindrical package of plastic bags as shown in FIG. 7.

Reference in now made to FIG. 10, illustrating a cross-sectional view of a cylindrical package of plastic bags as shown in FIG. 7. In FIG. 10, bags having one-way valves are laterally connected to each other. The bags are connected through their elongated dimension. The bags are filled with the material through a bottom opening 44, while in both cases the bags can be used while inserted within a bottle or independently.

Figure 11:
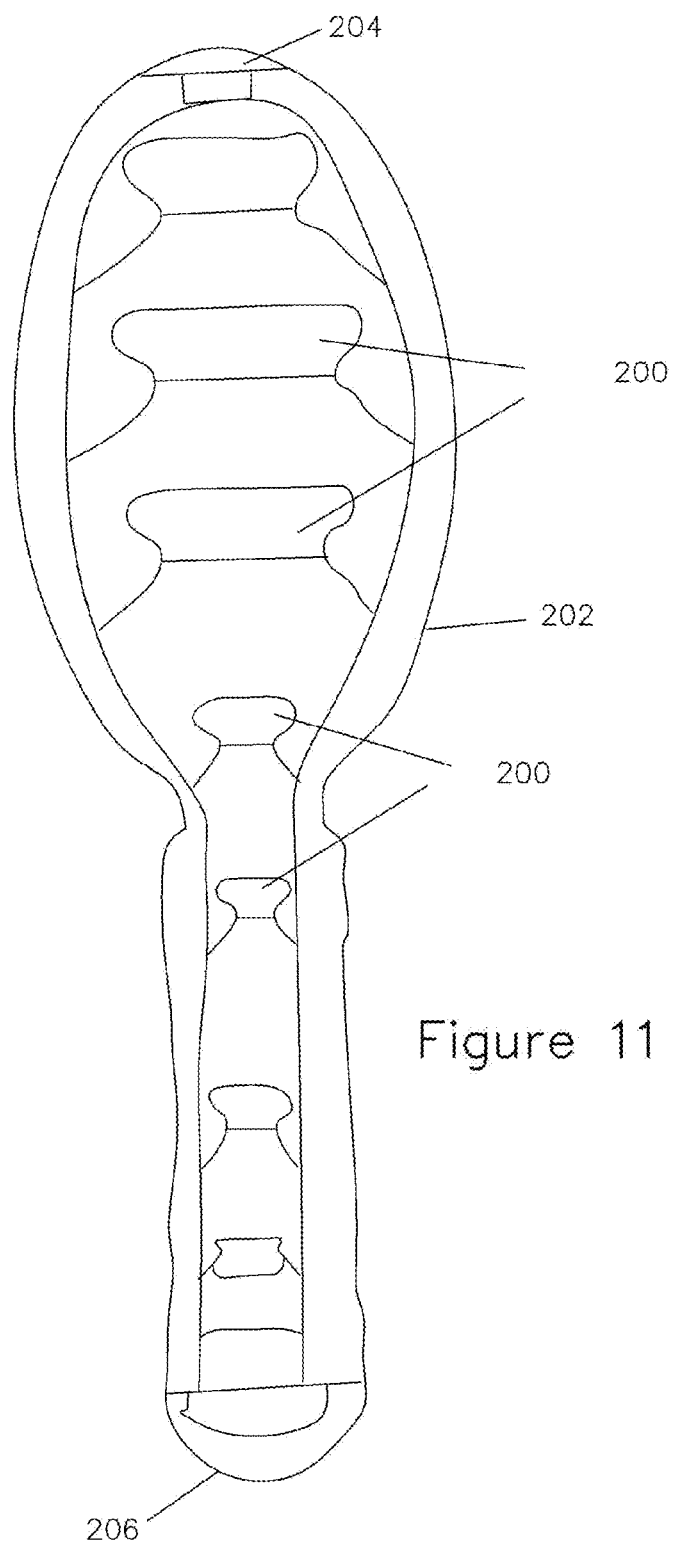
FIGS. 11a and 11b illustrate a front view and side view, respectively, of an apparatus for one-way conduction of cream out of a hairbrush in accordance with a preferred embodiment of the present invention.
Figure 11B:
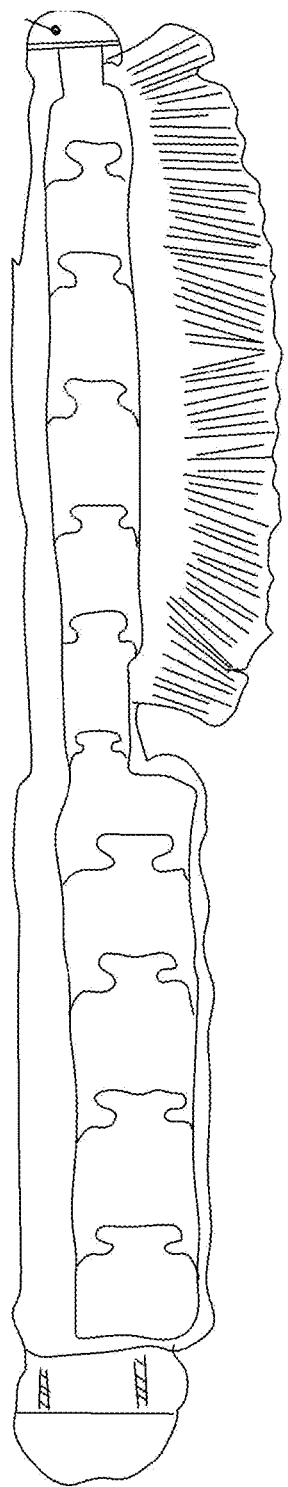

Reference is now made to FIGS. 11a and 11b, illustrating a front view and side view, respectively, of an apparatus for one-way conduction of cream out of a hairbrush, in accordance with a preferred embodiment of the present invention. It is possible to integrate one-way valves to hairbrushes with soap dispensers, allowing the conduction of the material along the brush as shown in the figure. Valves 200 in sizes are provided within a hairbrush 202 that has an opening 204 for ejecting the shampoo or any other material. Hairbrush 202 is provided with a second opening 206 that allows the user to fill the brush with material after it is ejected.

Figure 12A:
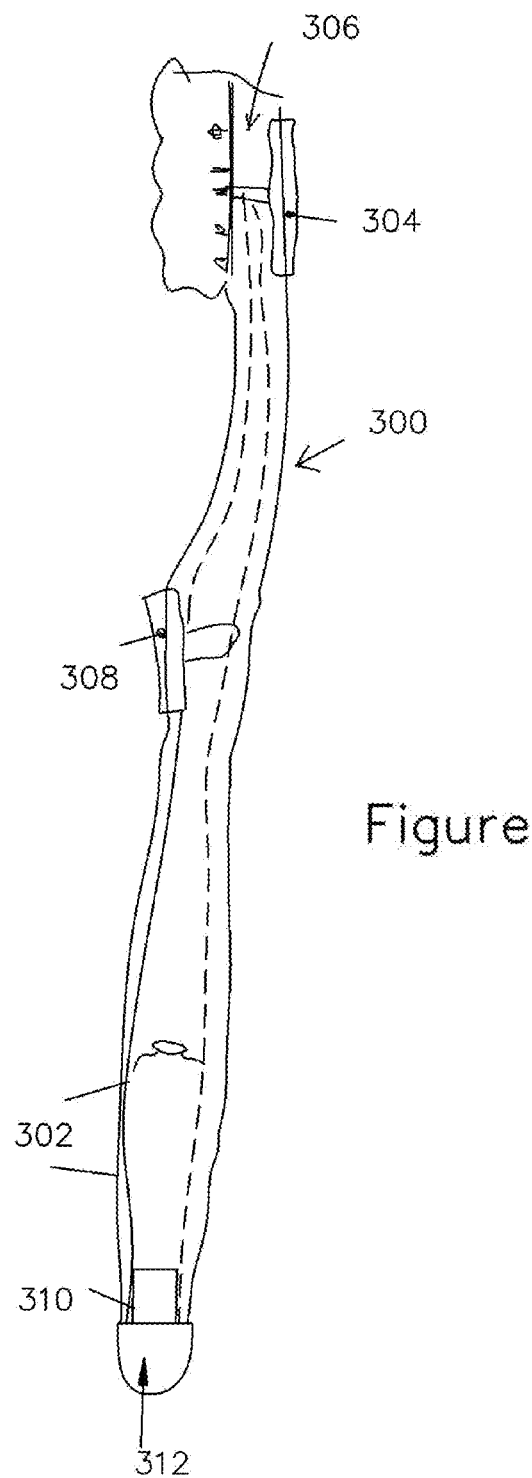
FIGS. 12a, 12b, and 12c illustrate cross-sectional views of a utilization of the apparatus as part of a toothbrush with a mechanism to control the ejection of the paste out of the toothbrush in accordance with preferred embodiments of the present invention.
Figure 12B:
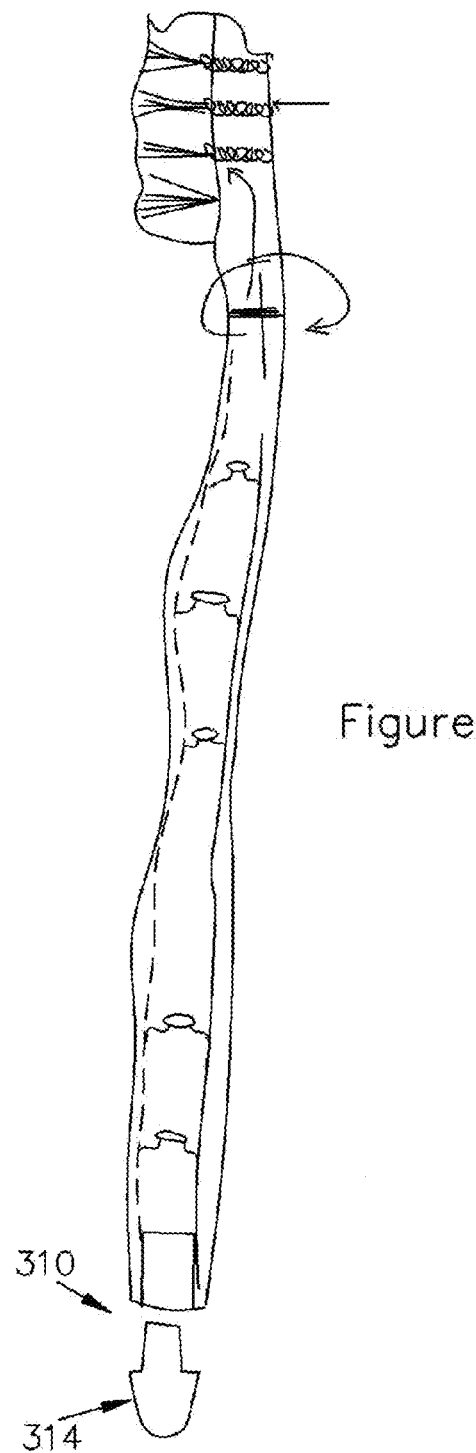
Figure 12C:
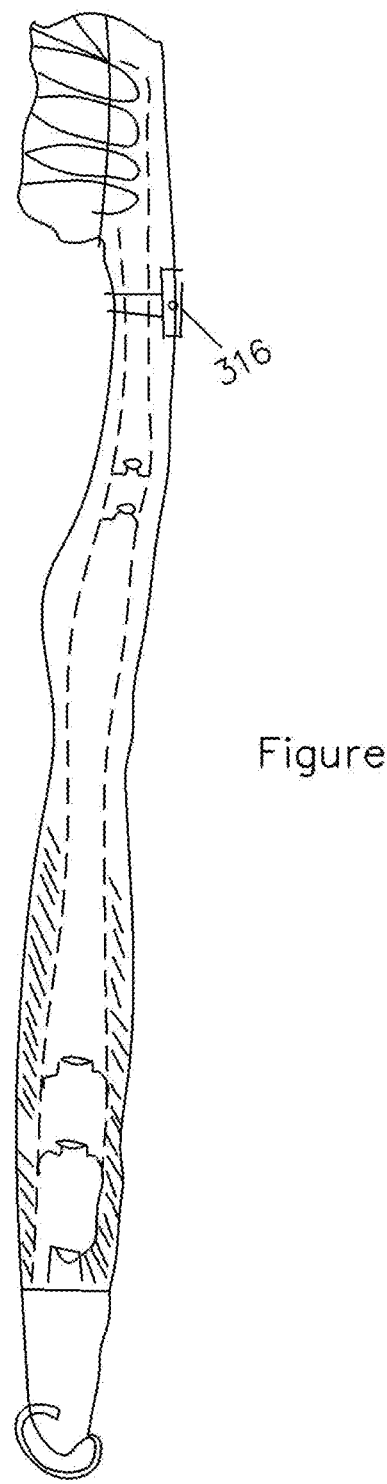

Reference is now made to FIGS. 12a, 12b, and 12c, illustrating cross-sectional views of utilization of the apparatus as part of a toothbrush within a mechanism to control the ejection of the paste out of the toothbrush, in accordance with preferred embodiments of the present invention. Similarly to the use of the valves in the hairbrush as shown herein before, one can utilize the valves in a toothbrush that is filled with toothpaste. In FIG. 12a, toothbrush 300 is provided with valves 302 all though the length of the brush where it is hollow and toothpaste is being inserted within. In this case, since the brush is rigid, a portion 304 is provided in the head of the brush that allows pushing the toothpaste through a canal 306 toward the brush hair. The mechanism of pushing the toothpaste can be a valve 308. The toothpaste is being filled through an opening 310 that can be sealed with a screw-on cap 312.

In FIG. 12b, another toothbrush is illustrated, wherein the toothbrush is provided with a rubber cap 314 at its filling opening 310.

In FIG. 12c, the toothbrush is provided with tooth-freshening liquid. The toothbrush is provided an opening/closing valve 316.

What is claimed is:

1. A one-way valve adapted to be provided in a pressable container from which material is ejected wherein the valve comprises:
    two adjacent tongues extending from a circumference of the pressable container, wherein a diameter of one of said tongues is larger than the diameter of the other, and wherein said two adjacent tongues have two states:
        a first state wherein the tongues are not folded on a fold line, thereby the material passes between the tongues; and
        a second state wherein the tongues are folded on said fold line and prevent passage of material through them; and
    an opening between said tongues, for ejecting the material therethrough at said first state,
wherein said opening is disposed above said fold line at said first state,
thereby said opening is disposed below said first state disposition at said second state.

2. A container adapted to allow a material stored within to be conducted solely in one direction, wherein said container comprises at least one on-way valve, comprising:
    two adjacent tongues extending from a circumference of the pressable container, wherein a diameter of one of said tongues is larger than the diameter of the other, and wherein said two adjacent tongues have two states:
        a first state wherein the tongues are not folded on a fold line, thereby the material passes between the tongues; and
        a second state wherein the tongues are folded on said fold line and prevent passage of material through them; and
    an opening between said tongues, for ejecting the material therethrough at said first state,
wherein said opening is disposed above said fold line at said first state,
thereby said opening is disposed below said first state disposition at said second state.

3. The container, as claimed in claim 2, wherein said container is selected from a group of containers such as pressable containers, tubes, bottles, plastic bags, and packs.

4. The container, as claimed in claim 2, wherein a plurality of containers are connected in a package wherein each container is adapted to be disconnected in a simple manner.

5. The container, as claimed in claim 2, wherein said container is a dispensing brush.

6. A container adapted to allow a material stored within to be conducted solely in one direction, the container being flexible plastic, and comprises at least one one-way valve that comprises:
- two adjacent tongues extending from a circumference of the pressable container, wherein a diameter of one of said tongues is larger than the diameter of the other, and wherein said two adjacent tongues have two states:
  - a first state wherein the tongues are not folded on a fold line, thereby the material passes between the tongues; and
  - a second state wherein the tongues are folded on said fold line and prevent passage of material through them; and
- an opening, for ejecting the material therethrough at said first state, wherein said opening is disposed above said fold line at said first state thereby said opening is disposed below said first state disposition at said second state; and a filing opening adapted to allow refilling.

\* \* \* \* \*